United States Patent [19]
Norris

[11] 4,192,593
[45] Mar. 11, 1980

[54] PHOTOGRAPHIC FILM ASSEMBLAGE

[75] Inventor: Philip R. Norris, Reading, Mass.

[73] Assignee: Polaroid Corporation, Cambridge, Mass.

[21] Appl. No.: 947,425

[22] Filed: Oct. 2, 1978

[51] Int. Cl.² .......................... G03B 17/50; G03B 17/26
[52] U.S. Cl. .......................................... 354/86; 354/277
[58] Field of Search ................... 354/83, 86, 180, 275, 354/276, 277, 283, 354

[56] References Cited

U.S. PATENT DOCUMENTS

| | | | |
|---|---|---|---|
| 3,996,595 | 12/1976 | Ivester | 354/83 |
| 4,032,937 | 6/1977 | Wright | 354/86 |
| 4,034,386 | 7/1977 | Gold | 354/86 |
| 4,072,968 | 2/1978 | Land et al. | 354/86 |

*Primary Examiner*—Donald A. Griffin
*Attorney, Agent, or Firm*—Alfred E. Corrigan

[57] ABSTRACT

A film assemblage for use with a camera of the self-developing type having a pair of superposed rollers for rupturing a container of processing liquid attached to an exposed film unit and spreading its contents across a photosensitive layer thereof while simultaneously advancing the exposed film unit toward the exterior of the camera. The assemblage includes a film cassette for housing a plurality of film units and an imbibition chamber which originally functions as a dark slide or cover for protecting the film units from exposure during its insertion into the camera. The imbibition chamber includes first and second opposed open ends and is tethered to the film cassette such that after the assemblage has been loaded into the camera and the imbibition chamber or dark slide has been removed from the film cassette and advanced toward the exterior of the camera by the superposed rollers, the tether runs out so as to retain the imbibition chamber in a position wherein its second open end is located exteriorly of the camera and its first open end is located just outboard of the superposed rollers. In such a position, the imbibition chamber is adapted to receive an exposed film unit via the first open end as it emerges from between the superposed rollers and maintain its exposed photosensitive layer in a substantially light free environment until the processing of the film unit by the liquid has reached a state wherein it may be removed from the imbibition chamber via the second opening without being subject to further exposure by the ambient light.

7 Claims, 4 Drawing Figures

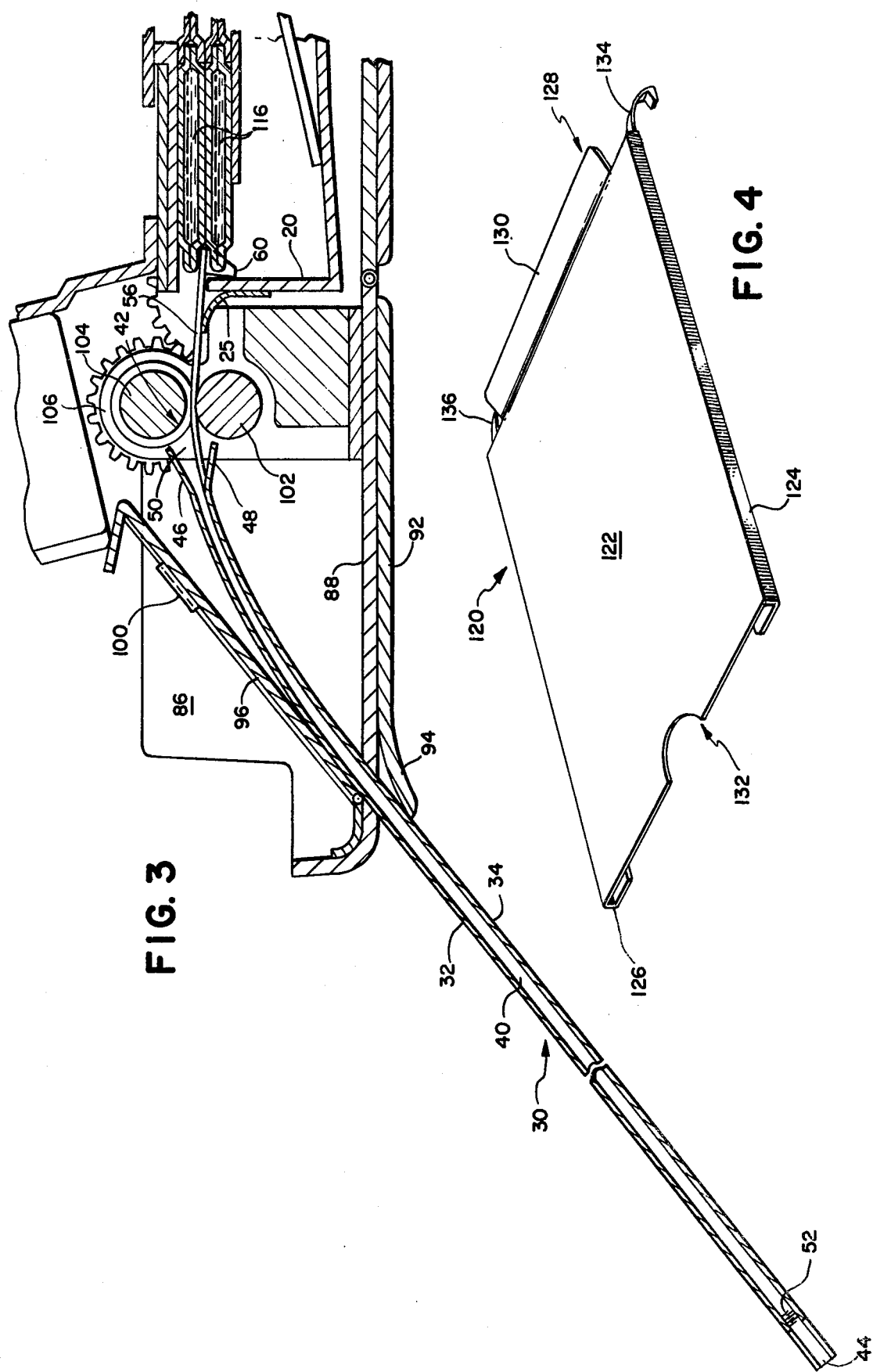

PHOTOGRAPHIC FILM ASSEMBLAGE

BACKGROUND OF THE INVENTION

1. Field of the Invention

This invention relates to a film assemblage including a film cassette, a plurality of film units of the self-developing type, and a dark slide which when removed from the film cassette functions as an imbibition chamber so as to protect a subsequently exposed film unit from further exposure by the ambient light.

2. Description of the Prior Art

The field of instant photography has advanced to the state where an integral self-developing type film unit may now be exposed and passed between a pair of rollers which spread a processing liquid across the photosensitive layer thereof to initiate formation of a visible image in the film unit while simultaneously moving the film unit through a short dark chamber and into the ambient light without adversely fogging or further exposing the film unit. A prime example of such a camera is the SX-70 Land Camera, manufactured by Polaroid Corporation of Cambridge, Massachusetts while a typical film unit may be of the type shown in FIGS. 2-4 of U.S. Pat. No. 3,647,437 granted to Edwin H. Land on Mar. 7, 1972. Basically, this is possible because the film unit is provided with an opacification system which (1) prevents further exposure of the exposed photosensitive layer in those areas which have been covered or treated by the processing liquid containing an opacifier and (2) also cooperates with the dark chamber to prevent actinic ambient light from being "piped", i.e., being transmitted, longitudinally along a transparent outer layer of the film unit until it reaches a position above the photosensitive layer which has not been covered by the processing liquid. However, if the film unit does not have an opacification system or if the exposed photosensitive layer of the film unit is only protected on one side such as by an opaque backing sheet or an opaque layer within the film unit, then provision must be made to maintain the exposed photosensitive layer in a light free environment until the processing liquid has imbibed the film unit to the extent that it is no longer susceptible to being adversely affected by the ambient light. One proposed solution is to provide the camera with an imbibition chamber such as shown in U.S. Pat. Nos. 4,034,386, 4,032,937 and 3,996,595 which fully encloses the exposed film unit or with an imbibition chamber as disclosed in U.S. Pat. No. 4,072,968, which protects the exposed film unit on only one side thereof. While the chambers in the above-noted patents perform their intended functions well, they are not directly related or tied into the type of film unit being exposed. For example, if one were to expose a film unit which did not have an opacification system in the cameras defined in U.S. Pat. Nos. 4,034,386 and 4,034,937 the chambers described therein had better be connected to the cameras or the exposed film unit will be further exposed when it exits from the camera. Also, such a film unit could not be used with the camera described in U.S. Pat. No. 4,072,968 since it only has provision for protecting one side of the emerging exposed film unit. Still further, all of the systems described in the above-noted patents would appear to deprive the photographer from taking a rapid sequence of exposures when using film units having a total opacification system since it appears that each exposed film unit must be removed from its imbibition chamber before another film unit can be exposed. True, a rapid sequence of exposures may be taken with the systems of the U.S. Pat. Nos. 4,034,937 and 4,034,386 patents if the photographer knows ahead of time that the film units contained therein have a total opacification system and therefore removes the chamber from the camera before taking any exposures. But, absent any indicia as to the type of film units contained within the camera, it would appear that one using such a camera for the first time in months may not be absolutely sure what type of film units are contained therein.

From the foregoing it can be seen that if cameras of the type described in the above-noted patents are to be used with film units containing full opacification systems and with those having no opacification system or less than a full opacification system, that it would appear to be more desirable to relate the imbibition chamber more directly to the type of film unit being exposed. This may be done by tying the two to each other when the film assemblage is originally being put together, i.e., make the imbibition chamber and the film units part of the same film assemblage.

SUMMARY OF THE INVENTION

The instant invention relates to a film assemblage for use with a camera of the self-developing type. The film assemblage includes a film cassette, a plurality of film units which do not have an opacification system or have less than a total opacification system, a platen for resiliently supporting a stack of film units in alignment with an exposure aperture in the film cassette, and a dark slide located between the uppermost film unit in the stack and the exposure aperture in the film cassette for protecting the uppermost film unit from being prematurely exposed by the ambient light during the loading of the film assemblage into a camera.

The dark slide may be formed from any suitable opaque material such as a sheet of Mylar which has been impregnated with carbon black or any other suitable opacifier. The dark slide is constructed to function as an imbibition chamber for receiving a film unit after it has been exposed within the camera and protecting the exposed photosensitive layer thereof from further exposure by the ambient light. In a preferred embodiment of the invention the dark slide takes the form of an elongate envelope having first and second opposed open ends. The first open end is formed in part by a pair of flap-like members which normally define a passageway which converges in the direction of the second open end to facilitate the introduction of the leading end of an exposed film unit into the imbibition chamber. Extending rearwardly from the first open end, i.e., away from the second open end, are a pair of thin, narrow, flexible strips of material, e.g., Mylar, each of which terminates in an enlarged end portion of a size which cannot pass through the film cassette's egress opening. These flexible strips function to tether the imbibition chamber to the film cassette during the operation of the camera in that when the dark slide or imbibition chamber is moved out of the film cassette via its egress opening, its movement is terminated when the enlarged end portions engage the interior surface of the cassette wall which defines the egress opening.

The film assemblage is adapted to be loaded into a camera of the self-developing type having a pair of spaced apart superposed rollers, a film unit advancing member, and an exit through which an exposed film unit emerges from the camera. After the film assemblage has been loaded into the camera, the dark slide or imbibition chamber is moved by the film unit advancing member through the egress opening of the film cassette and into the bite of the rollers, at least one of which is being driven at this time. The rollers continue the movement of the imbibition chamber out of the film cassette and toward the camera's exit until it reaches a position wherein its second open end extends through the exit and the first open end has just emerged from between the rollers. At this time, the tether runs out, i.e., the enlarged end portions which were moving with the imbibition chamber have moved to a position adjacent the egress opening in the film cassette where their size precludes further movement through the egress opening. The film unit previously protected from premature exposure by the imbibition chamber is urged by the platen into position to be exposed by light entering the film cassette via the exposure opening. Subsequent to its exposure the film unit is moved out of the film cassette and into the bite of the rollers. The rollers continue the advancement of the exposed film unit away from the film cassette while simultaneously rupturing a container of processing liquid attached to the leading end of the exposed film unit and spreading its contents across the film unit to initiate the formation of a visible image therein. As the leading end of the exposed film unit emerges from between the rollers it is immediately met by the converging passageway at the first open end of the imbibition chamber which guides the film unit into the light-tight environment of the imbibition chamber. Preferably, the length of the imbibition chamber is such that when the trailing end of the film unit moves out of engagement with the rollers its leading edge will be adjacent the second opening in the imbibition chamber. So located, the exposed film unit remains within the imbibition chamber until the processing liquid has sufficiently advanced the development of the image to a point where the film unit may be removed from the imbibition chamber via the second opening without fear of being adversely fogged or further exposed by the ambient light.

In an alternative embodiment the imbibition chamber is provided with a U-shaped cross section the legs of which define grooves for receiving the longitudinal edges of an exposed film unit. Since this type imbibition chamber provides protection for only one side of the exposed film unit it is used in those film assemblages wherein the film units need to be shielded from ambient light on only one side thereof, e.g. with film units of the type shown in FIGS. 3 and 4 of the aforementioned U.S. Pat. No. 3,647,437 wherein the opacifier has been removed from the processing liquid.

An object of the invention is to provide a film assemblage having a film cassette and a plurality of film units of the self-developing type located therein with a dark slide which when removed from the film cassette functions as an imbibition chamber for the film units.

Another object of the invention is to provide a film assemblage having a film cassette and a plurality of film units of the self-developing type with means for protecting the film units from inadvertent exposure to ambient light while they are located exteriorly of the film cassette.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein:

FIG. 3 is an enlarged side elevational view of a portion of the camera shown in FIG. 2 showing an imbibition chamber in position to receive a film unit after it passes between a pair of rollers; and FIG. 4 is a perspective view of an alternative form of an imbibition chamber.

DETAILED DESCRIPTION OF THE INVENTION

Figure 1:
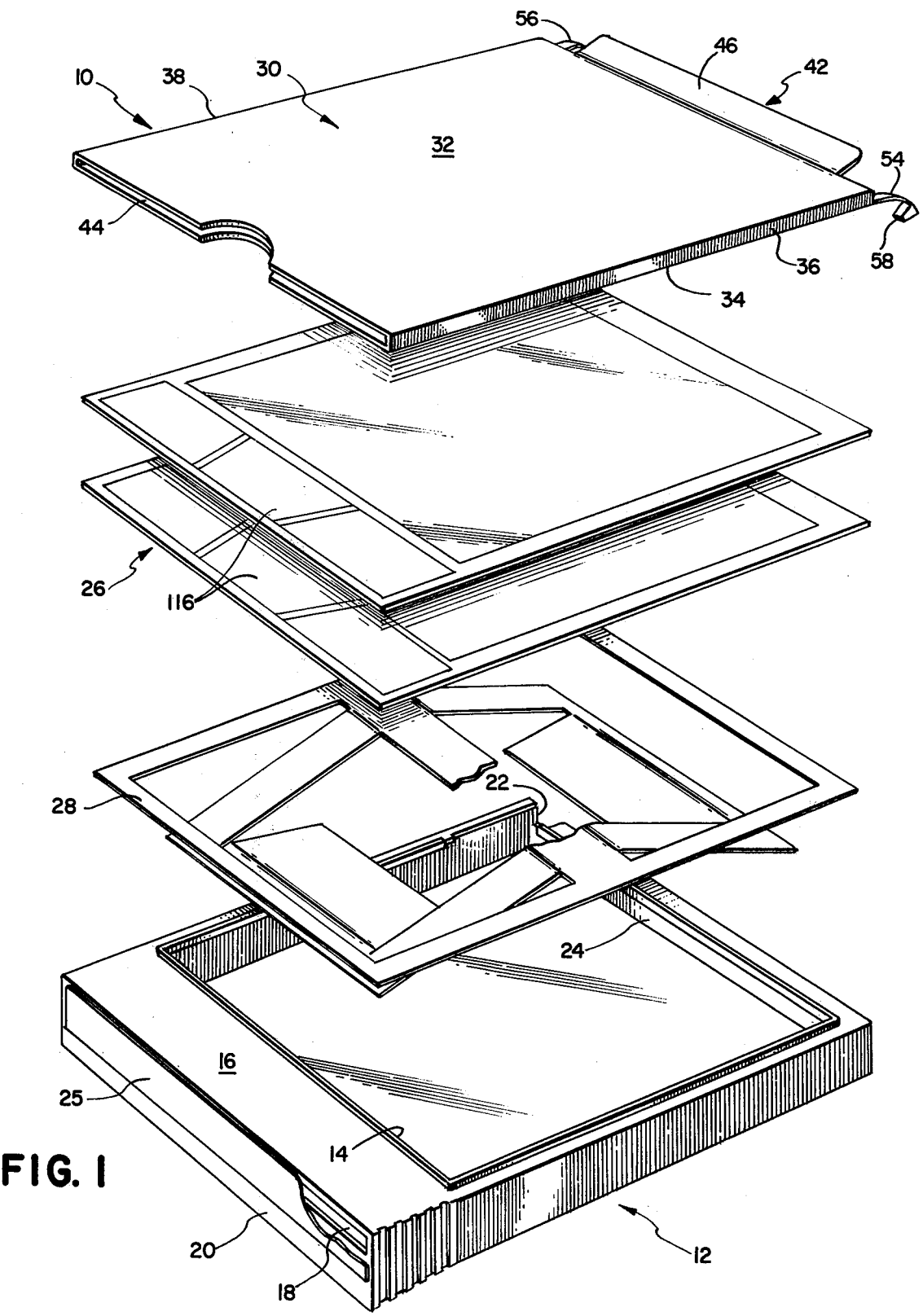
FIG. 1 is an exploded perspective view of the film assemblage of the instant invention.

Reference is now made to FIG. 1 of the drawings wherein is shown a film assemblage 10. The film assemblage includes a film cassette 12 having an exposure aperture 14 in a forward wall 16, an egress opening 18 in a leading end wall 20, and an ingress opening 22 which extends along a rear portion of the forward wall 16 and part way down a trailing end wall 24. A strip of resilient opaque material 25 is secured along its lower edge to the leading end wall 20 in light-tight relation to the egress opening 18. The film cassette 12 is adapted to house a stack of film units 26 (only two being shown) a platen 28 for resiliently supporting the stack of film units 26, and an opaque cover sheet or dark slide 30 which is adapted to be located between the uppermost film unit 26 in the stack and the interior surface of the forward wall 16 in light-tight covering relation to the exposure aperture 14. For reasons of clarity, a portion of the platen 28 has been cut away in FIG. 1 so as to provide an unobstructed view of the ingress opening 22 in the film cassette 12.

The film units 26 are preferably of the self-developing transparency type such as the one shown in FIG. 12 of U.S. Pat. No. 3,647,437 except that there is no opacifier or less than the full amount of opacifier in the processing liquid and the film unit does not contain a colorless layer containing alkali-activated optical filter agent. Further, since the film units 26 are positioned in a stack within the film cassette, the light being transmitted for the exposure of the uppermost film unit could effect the photoexposure of at least the next underlying film unit. This problem may be readily avoided by interposing an opaque member between the stacked film units. Such an opaque member may be a separate opaque interleaf sheet positioned between film units, or it may be an opaque layer so secured to the outer surface of the film unit, e.g., by a peelable or other temporary adhesive layer, as to be readily removed after the film unit has been removed from the imbibition chamber 30. Alternatively, the film units 26 may be of the reflective type such as those shown in FIGS. 3 and 4 of the above-noted U.S. Pat. No. 3,647,437 except that the processing liquid would have no opacifier or less than the full amount of opacifier, i.e., less than the amount required to allow the film unit to move into the ambient light without its exposed photosensitive layer being adversely fogged or further exposed by such ambient light.

In a preferred embodiment of the invention, the dark slide 30 is in the form of an elongate envelope having top and bottom walls 32 and 34, respectively, spaced from each other by a pair of side walls 36 and 38 to thereby define a chamber 40 having first and second opposed open ends 42 and 44, respectively. As is best seen in FIG. 3, the first open end 42 is defined in part by a pair of flap like members 46 and 48 which normally, i.e., when unrestricted, define a passageway 50 which converges in the direction of the second open end 44 so as to facilitate the introduction of the leading edge of an exposed film unit into the chamber 40. The second open end 44 is provided with suitable means 52, e.g., flocking, for light sealing the second open end 44.

The dark slide 30 is tethered to the film cassette 12 by a pair of flat, narrow, flexible strips 54 and 56 which extend rearwardly from the bottom wall 34 at opposite ends of the first open end 42. When the dark slide 30 is in the film cassette 12, the strip 56 is located in light-tight relation to the ingress opening 22 in the film cassette. Each of the strips 54 and 56 is provided with an enlarged end portion 58 and 60 having a thickness greater than the corresponding dimension of the egress opening 18 in the film cassette 12 thereby precluding its passage therethrough. Preferably, the end portions 58 and 60 are secured to the respective strips 54 and 56 by an adhesive whose bond will fail when the dark slide is manually pulled by the operator of the camera after the last film unit 26 in the film cassette 12 has been processed.

Figure 2:
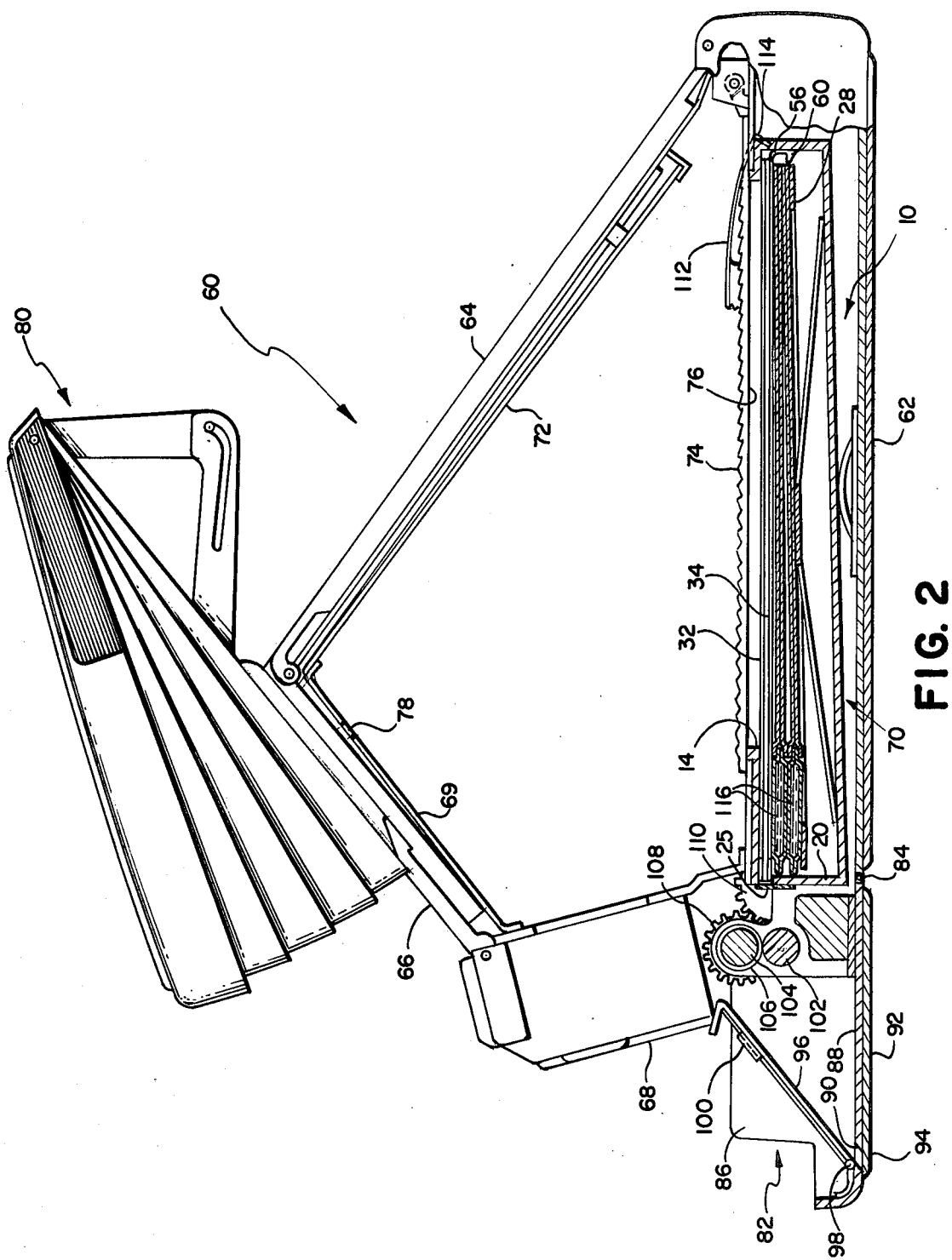
FIG. 2 is a side elevational view of a self-developing type camera having the film assemblage of FIG. 1 located therein.

The film assemblage 10 is adapted to be received by a camera of the self-developing type such as the camera 60 shown in FIG. 2. The camera 60 is similar to the SX-70 Land Camera mentioned hereinabove and includes a plurality of housing sections 62, 64, 66, and 68 pivotally connected to each other for movement between an extended operative position, as shown in FIG. 2, and a collapsed compact position. A bellows (only a portion of which is shown at 69) is suitably connected to the housing sections 62, 64 and 68 to provide a light-tight exposure chamber between the camera's lens and shutter assembly located within the housing section 68 and a film chamber 70. As is well known, such a bellows contains a first opening adjacent to and in alignment with the camera's objective lens for permitting light into the film chamber, a second opening which is substantially coincident with a mirror 72 secured to an inner surface of the housing section 64, a third opening substantially coincident with a pivotally member having a Fresnel lens 74 mounted on one side and a mirror 76 mounted on the opposite side thereof, and a fourth opening 78 which is located in alignment with an opening (not shown) in the housing section 66 which permits the light to enter the camera's view finder 80 during viewing and focusing of the image. For further details of the bellows reference may be had to U.S. Pat. No. 3,678,831 granted to J. Baker on July 25, 1972.

A spread roller housing section 82 is pivotally coupled at 84 to the housing section 62 for counterclockwise movement from its operative position, as shown in FIG. 2, wherein it extends across an open end of the film chamber 70, to a position in which the film assemblage 10 may be loaded into the film chamber 70. The housing section 82 includes a pair of side walls 86 (only one being shown) which are interconnected by a bottom wall 88 having an exit slot 90 therein through which a film unit may exit from the camera. A plate 92, formed from any suitable resilient material, is secured throughout substantially its entire area, except for an end portion 94, to the exterior surface of the bottom wall such that the end portion 94 defines a deflectable light shield across the entire exit slot 90. A second light shield 96 extends between the side walls 86 for preventing the entry of ambient light. The light shield 96 is pivotally mounted at 98 to the bottom wall 88 and is resiliently biased into its operative position, as shown in FIG. 2. A stop 100 extends inwardly from each of the side walls 86 for limiting the counterclockwise rotation of the light shield 96 to the position shown. Also mounted on the bottom wall 88 is a spread roller assembly including a pair of elongate superposed rollers 102 and 104. The roller 104 includes a pair of annular collars 106 at opposite ends thereof for predeterminely spacing the rollers away from each other so as to facilitate the introduction of the leading ends of the imbibition chamber 30 and the film units 26. One end of the roller 104 is also provided with a drive gear 108 which is coupled to a gear train (not shown) by an idler gear 110.

After the film assemblage 10 has been properly located within the camera 60, as shown in FIG. 2, and the spread roller housing section 82 secured in its operative position, the camera's motor is connected to a battery, which may be a part of the film assemblage 10, to drive a film advancing member 112. The film advancing member 112 is mounted within the housing section 62 for reciprocal movement and includes a resilient cantilevered arm whose downwardly turned free end 114 is adapted to extend into the ingress opening 22 in the film cassette 12, engage the trailing end of the imbibition chamber 30, and advance the leading edge of the imbibition chamber 30 into the gap between the rollers 102 and 104 as the film advancing member moves from right to left, as viewed in FIGS. 2 and 3. At this time, the roller 106 is being driven via its connection to the motor by the aforementioned gear train and the gears 108 and 110. The rollers 108 and 110 continue the movement of the imbibition chamber away from the film cassette 12 until the leading end of the imbibition chamber 30, i.e., the second open end 44, engages the second light shield 96. The light shield 96 deflects the leading end of the imbibition downwardly and guides it into the exit slot 90 where it in turn deflects the end portion 94 and emerges into the ambient light. As can best be seen in FIG. 3, the first open end 42 of the imbibition chamber 30 moves out of engagement with the rollers 102 and 104 at the moment that the enlarged end portions 58 and 60 move into engagement with the interior surface of the leading end wall 20 of the film cassette 12 on opposite sides of the stack of film units. Since the end portions 58 and 60 are of a size which precludes their passage through the egress opening 18, the imbibition chamber is maintained in the position shown in FIG. 3. It should be noted that although at this time the strips 54 and 56 are located between the rollers 102 and 104, their thickness is less than the predetermined minimum spacing between the rollers 102 and 104 thereby precluding the rollers from trying to advance the strips toward the exterior of the camera.

The camera is now ready to take its first exposure. The photographer views his subject through the viewfinder 90 and depresses the camera's exposure initiation cycle button (not shown) thereby closing a switch to the camera's electronic circuit. The shutter is then closed, and the pivotally mounted member carrying the mirror 76 is pivoted into a position adjacent the mirror 72. The shutter is then opened and the scene light is directed onto the mirror 76 by the camera's objective lens. The mirror 76 reflects this light downwardly onto the photosensitive layer of the endmost or uppermost film unit 26 located in the film cassette 12. After the exposure has been terminated, the mirror is returned to its original position and the film advancing member 112 is driven to move the exposed film unit out of the film cassette and into the bite between the rotating roller 104 and the roller 102. The rollers 102 and 104 continue the advancement of the exposed film unit toward the light shield 96 while simultaneously rupturing a container of processing liquid 116, located at the leading end of the exposed film unit, and spreading its contents across the exposed photosensitive layer of the film unit to initiate the formation of a visible image. As the leading end of the exposed film unit emerges from between the rollers 102 and 104 it enters the converging passageway 50 which guides the exposed film unit into the imbibition chamber 30. The advancing exposed film unit follows the gentle curvature of the imbibition chamber until its leading end reaches the second open end 44 of the imbibition chamber. At this time, the advancement of the exposed film unit is terminated by reason of its trailing end moving out of engagement with the rollers 102 and 104. The exposure cycle is then completed as the shutter opens again to permit through the lens viewing and the drive to the roller 104 is ended. The exposed film unit is allowed to stay in the substantially light-free environment of the imbibition chamber 30 until the processing liquid has sufficiently imbibed the film unit to the extent that it may be removed from the imbibition chamber 30 without fear that it will be fogged or further exposed by the ambient light. After the last exposed film unit has been removed from the imbibition chamber, the leading end of the imbibition chamber is grasped and pulled to separate the enlarged end portions 58 and 60 from their respective strips 54 and 56 thereby permitting the removal of the imbibition chamber 30 and the strips 54 and 56 from the camera.

Reference is now made to FIG. 4 wherein is shown an alternative form of imbibition chamber which is adapted for use in the film assemblage 10. The imbibition chamber, generally identified by the reference character 120, is formed from the same material as the imbibition chamber 30 and includes a forward wall 122 having a pair of downwardly and inwardly extending flanges 124 and 126 depending therefrom. The imbibition chamber 120 includes a first open end 138 defined in part by a pair of outwardly extending resilient flaps 130 (only one being shown) which define a passageway which converges in the direction of a second open end 132 to facilitate the entry of an exposed film unit into the imbibition chamber 120. As the exposed film unit enters the imbibition chamber 120 its longitudinal edges are slidably received by the flanges 124 and 126. The tethering means 134 and 136 are identical to those described with reference to the imbibition chamber 30. While the imbibition chamber 30 may be incorporated within film assemblages containing film units which do not have an opacification system or with those having less than a full opacifications system, the imbibition chamber 120 is specifically adapted to be incorporated into those film assemblages wherein the film units have an opaque layer, either chemically or mechanically formed, covering one major surface of the photosensitive layer and the forward wall 122 is adapted to cover the opposite major surface of the photosensitive layer.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A film assemblage for use with a camera of the self-developing type having a pair of superposed rollers mounted in position to receive therebetween an exposed film unit as it exits from a cassette for rupturing a container of processing liquid attached to the exposed film unit to thereby spread its contents across a photosensitive layer thereof to initiate formation of a visible image therein while simultaneously advancing the exposed film unit toward the exterior of the camera, said film assemblage comprising:

a film cassette having an exposure opening in one wall thereof, through which a film unit is adapted to be exposed, an ingress opening through which a portion of a film advancing member is adapted to extend prior to moving an exposed film unit out of said film cassette, and an egress opening through which the exposed film unit is adapted to be moved from said film cassette by the film advancing member;

a plurality of film units located within said film cassette, each said film unit comprising a photosensitive layer and a container of processing liquid, said film units being arranged in a stack with said photosensitive layer of an endmost film unit being located adjacent to and in alignment with said exposure opening;

an imbibition chamber formed from an opaque material ahd having first and second oppositely located open ends, said imbibition chamber being located within said film cassette between said endmost film unit and said exposure opening so as to prevent premature exposure of said endmost film unit and with said first open end located adjacent said ingress opening and said second open end located in alignment with said egress opening, said first and second open ends having a width larger than that of said film units; and means for tethering said imbibition chamber to said film cassette such that when said film assemblage is properly located within the camera and said imbibition chamber is moved out of said film cassette via said egress opening by the film advancing member and the rollers, said tethering means terminates movement of said imbibition chamber when said first open end of said imbibition chamber first moves out of engagement with said rollers and a portion of said imbibition chamber including said second open end is located exteriorly of the camera, whereby said imbibition chamber is maintained in position to receive said endmost film unit, subsequent to its exposure, via said first opening as it exits from the rollers and maintain at least the portion of its said photosensitive layer which is located within said portion of said imbibition chamber which is located exteriorly of the camera in a substantially light free environment until said exposed endmost film unit is removed from said imbibition chamber via said second opening.

2. The film assemblage of claim 1 wherein said first opening is defined in part by a pair of members which normally form a passageway converging in the direction of said second open end to facilitate the introduction of said exposed endmost film unit into said imbibition chamber.

3. The film assemblage of claim 1 wherein said tethering means includes means adapted to extend between the rollers when said first open end of said imbibition chamber is located in position to receive said exposed endmost film unit, said means having a thickness less than the spacing between the rollers to thereby prohibit the engagement and advancement of said tethering means by the rollers.

4. The film assemblage of claim 1 wherein said tethering means includes a pair of laterally spaced members extending from opposite sides of said first open end, each said member having an enlarged end portion of a thickness greater than the corresponding dimension of said egress opening whereby said tethering means remains coupled to said film cassette when said first open end of said imbibition chamber is located in position to receive said exposed endmost film unit.

5. The film assemblage as defined in claim 1 wherein said imbibition chamber is an envelope for fully enclosing said exposed endmost film unit.

6. The film assemblage as defined in claim 1 wherein said imbibition chamber includes a first section adapted to overlie at least the exposed photosensitive layer of said exposed endmost film unit and a pair of spaced apart flanges positioned to respectively overlie portions of said first section immediately adjacent the longitudinal edges of said first section and respectively connected to the longitudinal edges of said first section so as to slidably receive the opposed longitudinal edges of said exposed endmost film unit as its leading edge is introduced into said imbibition chamber via said first open end.

7. The film assemblage of claim 1 wherein said tethering means is located in light-tight relation to said ingress opening when said imbibition chamber is located within said film cassette.

* * * * *